United States Patent [19]

Schaffner

[11] 3,913,986
[45] Oct. 21, 1975

[54] ENDLESS TRACK FOR VEHICLE

[75] Inventor: Donald L. Schaffner, Springfield, Ill.

[73] Assignee: Fiat-Allis Construction Machinery, Inc., Deerfield, Ill.

[22] Filed: Jan. 2, 1974

[21] Appl. No.: 429,990

Related U.S. Application Data

[62] Division of Ser. No. 311,338, Dec. 1, 1972.

[52] U.S. Cl. ............................... 305/57; 305/39
[51] Int. Cl.² ................................ B62D 55/20
[58] Field of Search .............. 305/53, 54, 57, 58, 39

[56] References Cited
UNITED STATES PATENTS

| | | | |
|---|---|---|---|
| 3,333,903 | 8/1967 | Orr | 305/58 |
| 3,357,750 | 12/1967 | Reynolds | 305/58 |
| 3,359,044 | 12/1967 | Boggs | 305/57 |
| 3,601,454 | 8/1971 | Reinsma | 305/54 |
| 3,717,387 | 2/1973 | Cackley | 305/54 |
| 3,717,389 | 2/1973 | Boggs | 305/54 |

Primary Examiner—Philip Goodman
Assistant Examiner—John A. Carroll

[57] ABSTRACT

A short pitch, high speed track of high efficiency and low noise level. In one embodiment the major wear surfaces are on an integral shoe structure. In a second embodiment drive lugs, guide rails and roller engaging surfaces are formed on a separate replaceable part releasably secured to a shoe part. In a third embodiment the drive lugs and the guide rails are formed on a separate replacement part releasably secured to a shoe part.

5 Claims, 10 Drawing Figures

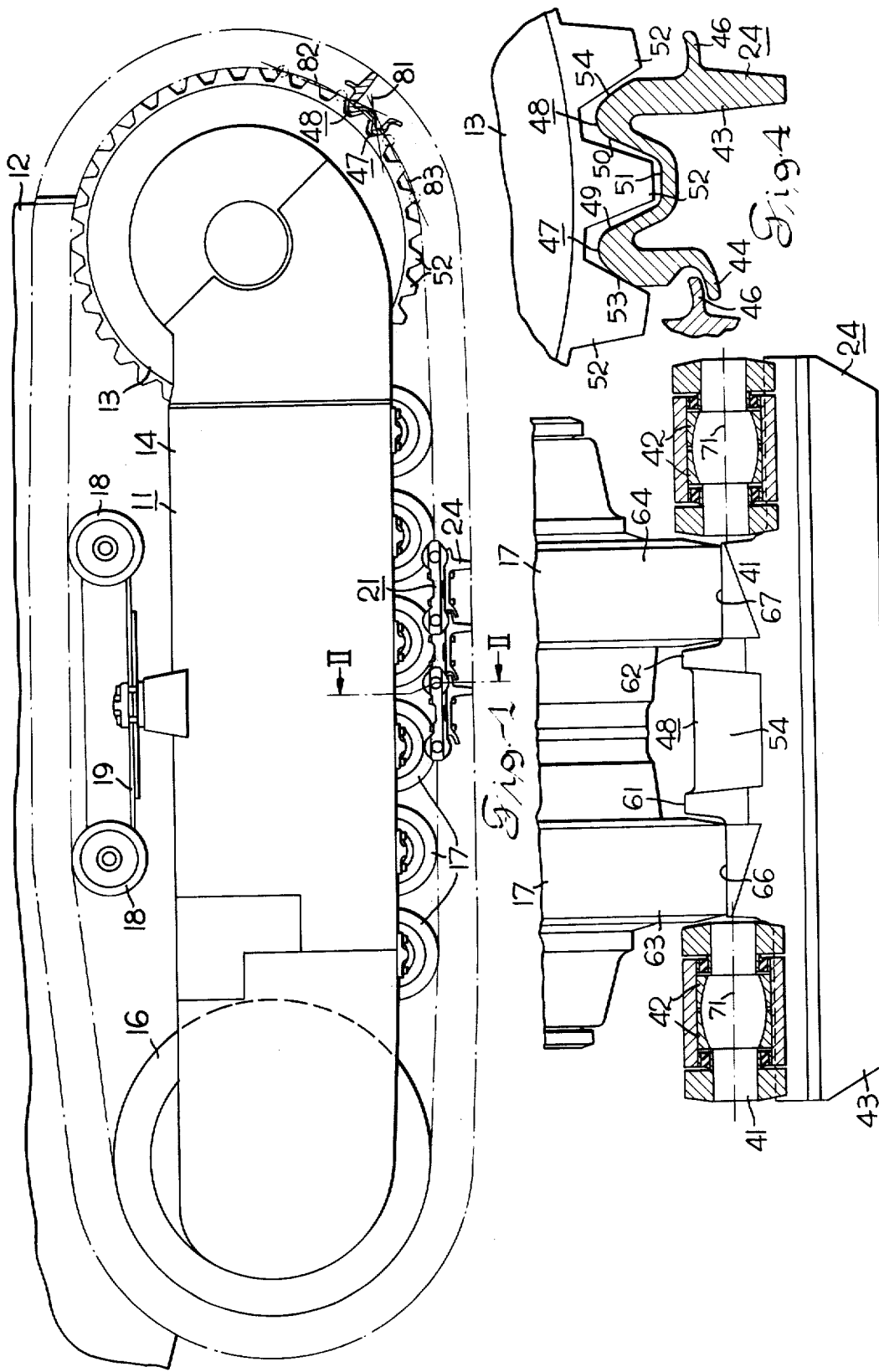

ENDLESS TRACK FOR VEHICLE

This is a division, of application Ser. No. 311,338 filed Dec. 1, 1972.

BACKGROUND OF THE INVENTION

Heretofore others have suggested single-piece shoe structures for an endless track wherein a pair of link type chains are releasably secured to the transversely opposite ends of the shoe structures. One such arrangement is shown in U.S. Pat. No. 3,333,903, B. J. Orr and J. E. Neilson, Endless Track for Track Laying Vehicles, issued Aug. 1, 1967. Also, it has heretofore been suggested that certain parts of the track link be made as replaceable parts. Examples of such construction include U.S. Pat. No. 3,359,044, R. L. Boggs, Tractor Track Shoe with Replaceable Wear Plate, issued Dec. 19, 1967 and U.S. Pat. No. 3,053,579, F. E. Trudeau, Crawler Tread, issued Sept. 11, 1962.

BRIEF DESCRIPTION OF THE INVENTION

Three different embodiments of the invention are illustrated and described. In FIGS. 1, 2, 3 and 4 a one piece shoe structure has its transversely opposite ends connected to links of a pair of link type chains which provide the inter-connection between the pivoted sections of the endless track. A pair of sprocket engaging drive lugs are provided on the central top portion of the shoe structure and a pair of guide rails are integrally formed with and disposed at transversely opposite sides of the drive lugs. A pair of flat roller tracks are provided at the transversely outer sides of the guide rails intermediate the guide rails and the endless link chains. One of the drive lugs is engaged by the sprocket during forward propulsion of the tractor and the other of the drive lugs is engaged by the sprocket during reverse operation of the tractor. The longitudinally inward facing surfaces of the drive lugs define a depression therebetween into which a sprocket tooth extends without engagement with such surfaces. In the second embodiment of the invention, illustrated in FIGS. 5, 6 and 7, the drive lugs, guide rails and flat roller engaging surfaces are formed as an integral component which is releasably secured to a shoe part. In the embodiment of the invention shown in FIGS. 8, 9 and 10, the roller engaging surfaces are integrally formed on the shoe part; however, the drive lugs and guide rails are integrally formed as a single component which is releasably secured to the shoe. The endless tracks of this invention have long wear life and have a relatively low noise level. The pivot axes, roller engaging surfaces and sprocket contact surfaces lie substantially in the same plane thereby providing superior track efficiency. The roller engaging surfaces are relatively wide thus increasing their effective wear life.

BRIEF DESCRIPTION OF THE DRAWINGS

Three embodiments of the present invention are illustrated by the drawings in which:

FIG. 1 is a side view of a crawler tractor having a track incorporating present invention;

FIG. 2 is a view taken on line II—II in FIG. 1;

FIG. 4 is a view taken along the line IV—IV in FIG. 3;

DETAILED DESCRIPTION OF THE INVENTION

Figure 3:
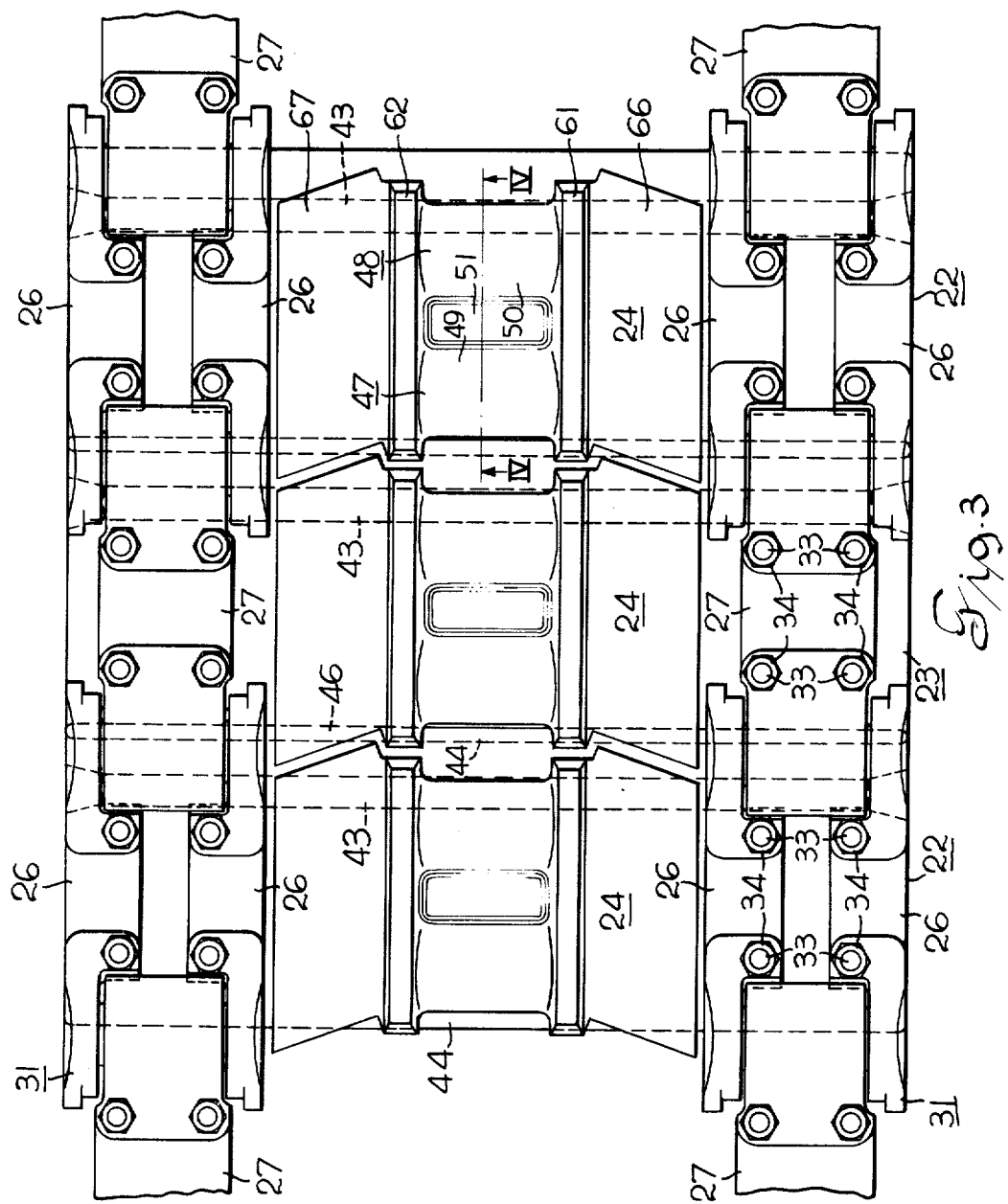
FIG. 3 is a top view of a part of the track illustrated in FIGS. 1 and 2.

Referring to FIG. 1 of the drawings there is shown an endless track mechanism 11 mounted on one side of a crawler tractor 12, which has suitable power means, not shown, connected through a transmission, not shown, to a drive sprocket 13 which is rotatably supported on the tractor and a track frame 14. The track frame 14 also rotatably supports a front idler 16, track rollers 17 and a pair of support rollers 18, the latter being mounted at opposite ends of a leaf spring 19. Referring also to FIGS. 2, 3 and 4, an endless track 21 is supported on the sprocket 13, the idler 16 and the rollers 17 and 18. The track 21 is comprised of a plurality of track sections 22, and 23, each of which include a shoe structure 24. The opposite transverse ends of the shoe structures 24 are releasably secured to links 26 and 27 of a pair of endless link chains 31. The links 26 and 27 are releasably fastened to the shoe structures 24 by bolts 33 and nuts 34 and, as shown in FIG. 2, the links 26 are connected to link 27 by a pivot pin 41. The central portion of the pivot pin 41 is barrel shaped and is in bearing engagement with complementary annular bushings 42 which may be constructed of teflon impregnated fibers. The bottom ground engaging portion of the shoe structure 24 includes a transversely extending grouser 43 adjacent one longitudinal edge thereof. The longitudinal edges of the shoe structures 24 are formed as continuous, complementary dirt excluding flanges 44 and 46 in lapping relation to one another.

A pair of longitudinally spaced drive lugs 47 and 48 are formed at the longitudinally opposite sides of the central top portion of the shoe structure 24. As shown in FIG. 4, the longitudinally inner surfaces 49 and 50 of lugs 47, 48 define a depression 51 into which a tooth 52 of the drive sprocket 13 extends without contact herewith. The longitudinally outer surfaces 53 of the drive lug 47 contacts a sprocket tooth 52 during forward driving of the tractor. When the tractor is operated in reverse, the longitudinally outer surface 54 of the drive lug 48 is contacted by a tooth 52 of the sprocket 13. The inner drive lug surfaces 49 and 50 are not used as driving suraces.

The lugs 47 and 48 extend transversely between and are integrally connected to a pair of longitudinally extending guide rails 61 and 62, which are slightly higher than the drive lugs. As shown in FIG. 2, the guide rails 61 and 62 are designed to keep the track on the track roller 17. The roller 17 includes a pair of cylindrical load bearing surfaces 62 and 64, which engage a pair of flat, longitudinally extending roller engaging surfaces 66 and 67 formed on transversely opposite sides of the guide rails 61 and 62. The guide rails are longitudinally extending flanges extending upwardly from the transversely inner sides of the roller engaging surfaces 66 and 67. The roller engaging surfaces 66 and 67 are formed integrally with the shoe structure 24 and have angularly disposed longitudinal edges, as shown in FIG. 3, so as to provide a continuous engagement of the track with roller 17 as the latter passes from one track section to the next. The portions of the sprocket engaging surfaces 53 and 54 of the drive lugs 47, 48 engaged by the sprocket teeth are in proximate alignment with a plane defined by the pivot axes 71 on which the track sections 22, 23 are joined by the pins 41. The teeth 52 of the sprocket 13 exert a driving force against the lug at a point relatively close to the plane defined by the axes of the pins 41 and when the track is wrapped around the sprocket, a line 81 perpendicular to a line tangent to the point on the sprocket tooth 52 contracted by the lug 47 will pass through the intersection of planes 82, 83 defined by the pivot axes of preceding track section and the following track section. This track construction affords an efficient application of driving force by the sprocket to the endless track. By using a pair of drive lugs with sprocket engaging surfaces 53, 54 adjacent the longitudinally opposite edges of the shoe structure, heat treatment of said surfaces is facilitated.

Figure 5:
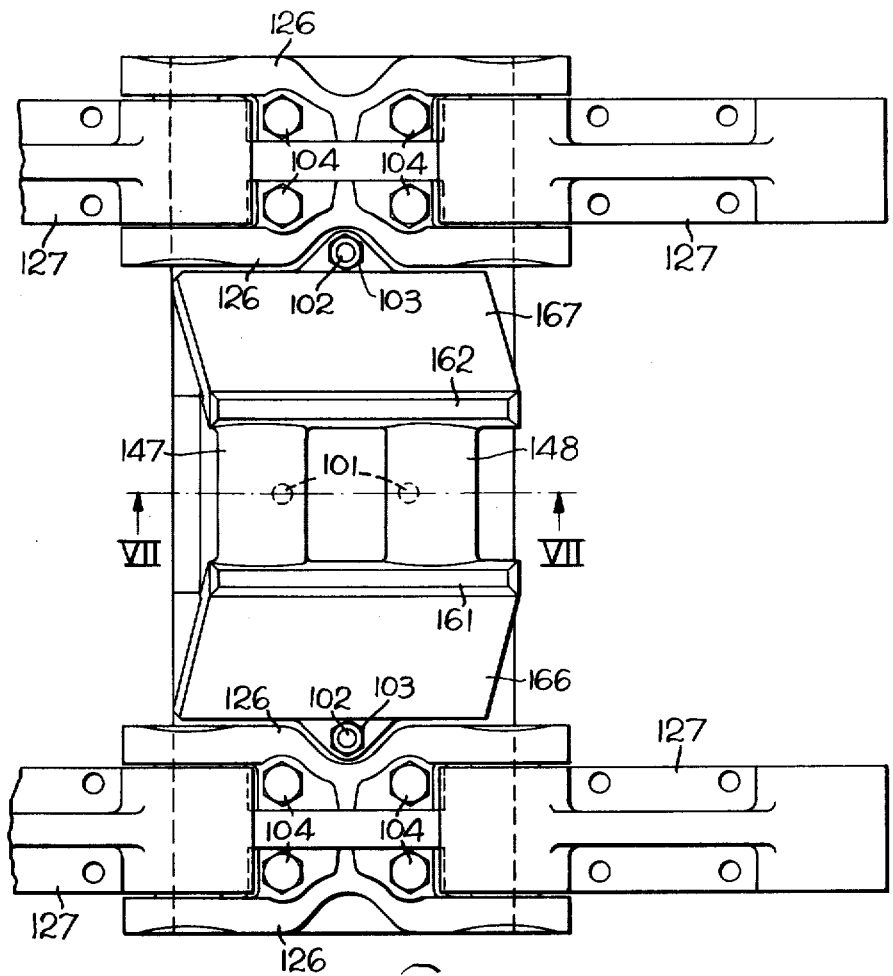
FIG. 5 is a top view of a track constructed in accordance with the second embodiment of the present invention.
Figure 6:
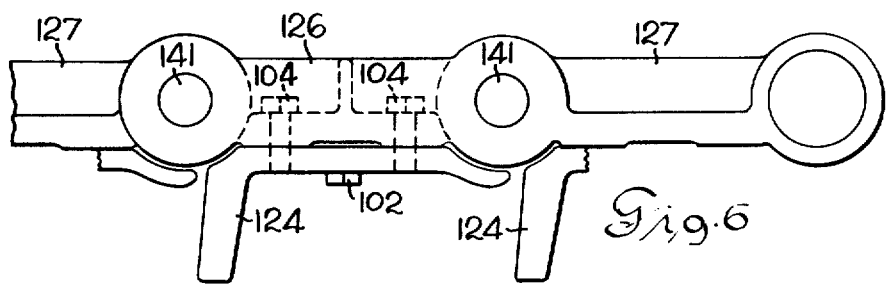
FIG. 6 is a side view of the track shown in FIG. 5.
Figure 7:
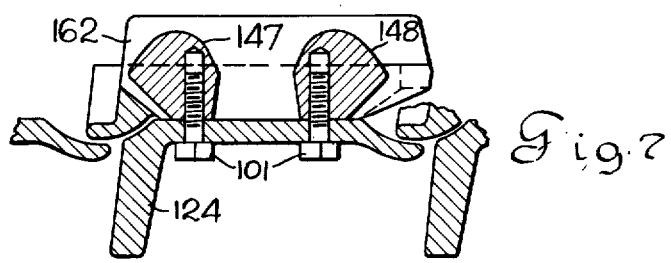
FIG. 7 is a view taken along the line VII—VII in FIG. 5.

Referring to FIGS. 5, 6 and 7, it will be noted that the driving lugs 147 and 148, the guide rails 161 and 162 and the roller engaging surfaces 166 and 167 are integrally formed as a single component which is secured to a rolled section shoe 124 by cap screws 101 and bolts 102 and nuts 103. The links 126 are pivotally connected to links 127 by suitable pivot pins 141 and the links 126 are releasably secured to the shoes 124 by cap screws 104. The embodiment of the invention illustrated by FIGS. 5, 6 and 7 possess most of the functional advantages of the track shown in FIGS. 1 through 4 and possess an additional advantage of having the lugs, guide rails and roller engaging surfaces on a separate component, which can easily be replaced when excessively worn.

Figure 8:
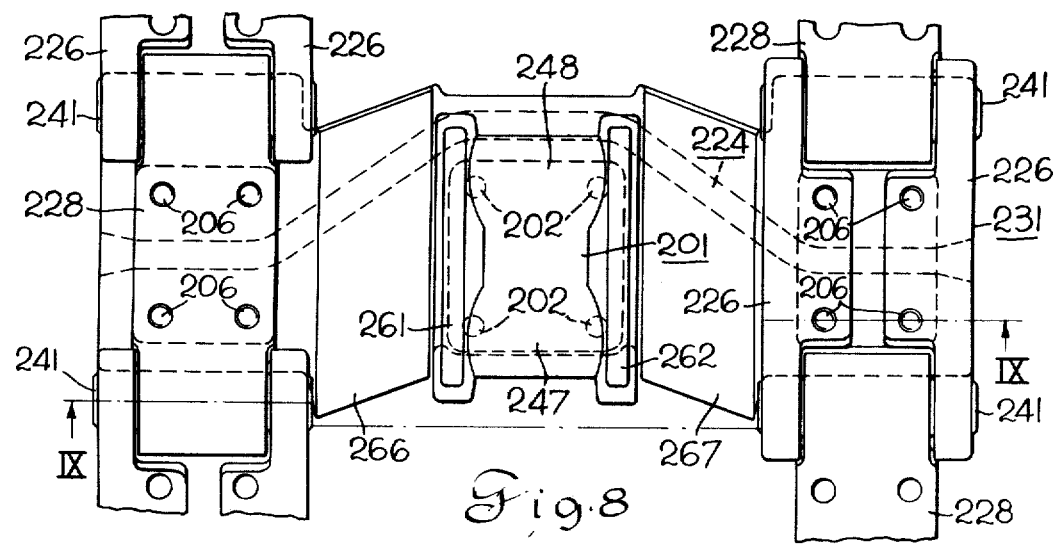
FIG. 8 is a top view of a third embodiment of the present invention.
Figure 9:
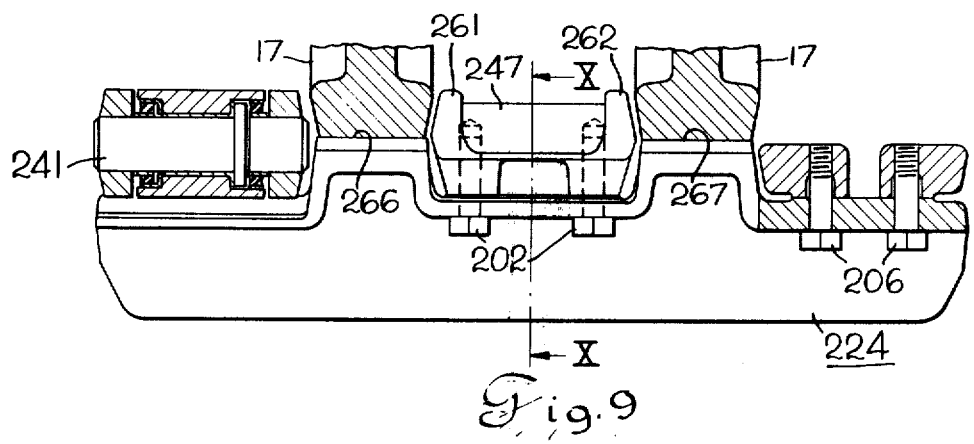
FIG. 9 is a view taken along the line IX—IX in FIG. 8.
Figure 10:
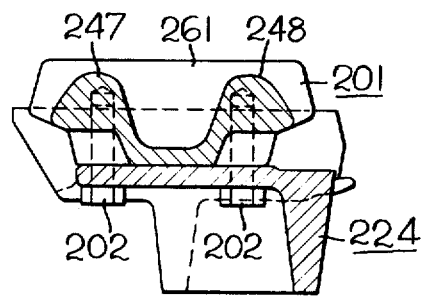
FIG. 10 is a view taken along the line X—X in FIG. 9.

Referring to FIGS. 8, 9 and 10, wherein a third embodiment of the present invention is illustrated, it will be noted that the shoe structure includes a shoe 224 having a pair of roller engaging surfaces 266, 267 formed integrally thereon. However, drive lugs 247, 248 and guide rails 261 and 262 are integrally formed as a single component 201, which is releasably secured to the shoe by four cap screws 202. Suitable pivot pins 241 are provided for interconnecting the links 226 and 228 to one another. The links 226, 228 of the track section 231 are secured to the shoe 224 by suitable cap screws 206. It will be noted that the ground engaging grouser curves horizontally from alignment with the central transverse plane of the track section at the transverse edges to a position adjacent a longitudinal edge of the shoe structure at the transverse central portion thereof. This curviture reduces side slipping in side hill operations. The advantage of the embodiment of the invention illustrated in FIGS. 8, 9 and 10 is that the drive lugs and guide rails can be replaced when they become excessively worn without requiring the replacement of the other components of the track.

The embodiments of the invention in which an exclusive property or privilege is claimed are defined as follows:

1. A section of an endless track for a crawler tractor comprising:

a pair of transversely spaced parallel links adapted at longitudinally opposite ends thereof for pivotal connection on parallel axes to complementary links, a shoe structure extending transversely between and having its opposite transverse ends disposed below and releasably secured to said links, respectively, said shoe structure having a top side and a bottom side and including a ground engaging part on the bottom side of said shoe structure, means for releasably securing said shoe structure to said pair of links, a component releasably secured to the top side of said shoe structure and having an upper side, means for releasably securing said component to said shoe structure, a pair of longitudinally spaced sprocket engaging drive lugs of the central portion of the upper side of said component, a pair of longitudinally extending guide rails on the upper side of said component and adjacent transversely opposite sides of said drive lugs, and a pair of flat roller engaging surfaces, each roller engaging surface located between one of said guide rails and one of said links, said roller engaging surfaces being disposed above but in closed proximity to a plane defined by said axes.

2. The invention of claim 1 wherein said lugs include sprocket contact surfaces lying close to a plane defined by said axes.

3. The invention of claim 1 wherein said ground engaging part includes a horizontally curved grouser with ends near the central transverse plane of the section at the transverse ends of said shoe structure and with a transversely central portion adjacent one longitudinal edge of said shoe structure.

4. The track defined in claim 1 wherein said integral component includes said roller engaging surfaces.

5. The track defined in claim 1 wherein said roller engaging surfaces are provided on the top side of said shoe structure.

* * * * *